Patented Mar. 2, 1937

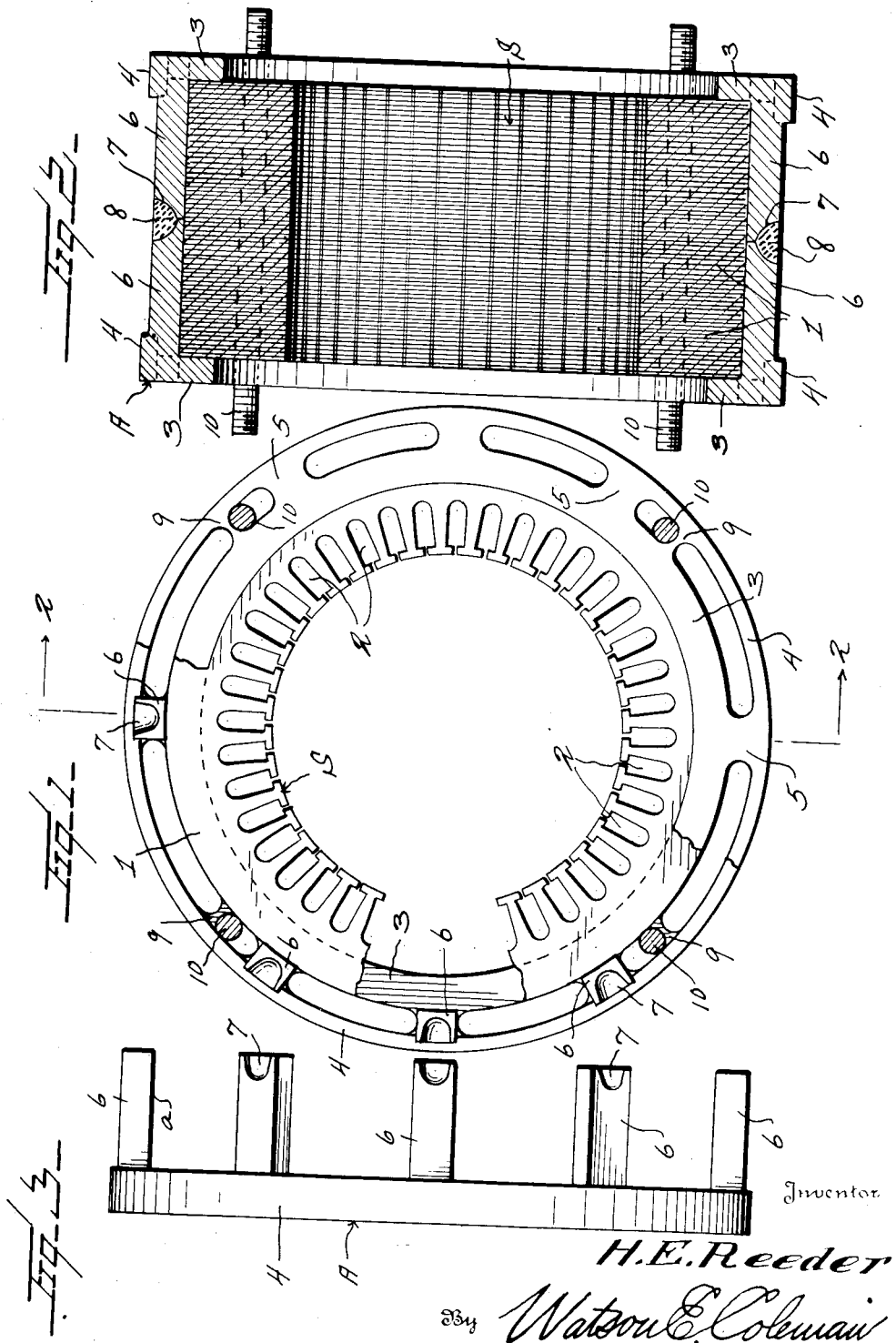

2,072,769

UNITED STATES PATENT OFFICE 2,072,769

ELECTRIC MOTOR CONSTRUCTION

Homer E. Reeder, Lima, Ohio

Application October 24, 1936, Serial No. 107,455

7 Claims. (Cl. 171—252)

This invention relates to electric motor construction, and it is primarily an object of the invention to provide a stator unit wherein the laminations of the stator ring are effectively held and maintained in assembled relation and whereby the desired assembly of the unit may be produced conveniently and effectively.

The invention also has for an object to provide a frame construction for a stator unit or the like comprising substantially duplicate sections, said sections including bars, said bars of one section aligning with the bars of the second section and the bars being of such lengths as to permit a welding or other preferred connection between the bars of the two sections at substantially the middle or central portion of the stator unit.

An additional object of the invention is to provide a frame structure of this kind comprising substantially duplicate sections, each of said sections being two concentric members maintained in desired relation through the medium of interposed connecting supports or webs, certain of said supports or webs providing means for holding the stator unit against turning when said unit is in applied position.

The invention also has for a particular object to provide a novel and improved method of producing a stator unit for an electrical motor or kindred apparatus.

The invention consists in the details of construction and in the combination and arrangement of the several parts of my improved electric motor construction whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in side elevation with portions broken away of a stator unit constructed in accordance with an embodiment of my invention;

Figure 2 is a sectional view taken substantially on the line 2—2 of Figure 1;

Figure 3 is a view in side elevation of one of the end frame sections unapplied.

In the embodiment of my invention as illustrated in the accompanying drawing, S denotes a stator ring comprising a plurality of laminations 1 arranged in abutting relation, said ring S having the usual slots 2 spaced about the inner periphery thereof for the reception in a well known manner of the conventional coils.

The laminations 1 are initially assembled on a mandrel and placed between the sections A of the frame structure and pressed between said sections A preferably under hydraulic pressure. The frame sections while under such pressure are welded together as will hereinafter be more particularly referred to.

The sections A are of duplicate construction and each one comprises two concentric annular members 3 and 4 in spaced relation, the inner member 3 constituting a band and the outer member 4 a ring. The outer face of the band 3 and the outer edge of the ring 4 as herein disclosed are coplanar and the width of the ring 4 is preferably greater than the thickness of the band 3 so that the inner edge of the ring 4 terminates a slight distance inwardly of the band 3. At predetermined spaced points the band 3 and ring 4 are connected by the interposed supports or webs 5 integrally formed therewith, and integrally formed with said supports or webs 5 and with the adjacent portions of the outer member or ring 4 are the inwardly disposed bars 6 preferably rectangular in cross section with the under flat faces $a$ of said bars 6 at right angles to the inner flat face of the band 3.

Each of the bars 6 is of a length equal to substantially one-half of the axial dimension of the stator ring S so that as the unit is assembled under compression the ends of the bars 6 of one frame section A will contact or abut the ends of the bars 6 of the second frame section A. It is to be understood, of course, that in the initial assembly of the frame sections A and the stack of laminations 1 these bars 6 of the frame sections A are in proper alignment.

The outer extremities of the bars 6 of both of the sections A are cut out or recessed, as at 7, to provide pockets to facilitate desired welding, as at 8, to connect the sections A of the frame together. The welding operation occurs during the period the frame sections A and interposed stack of laminations 1 are under pressure. It is to be noted that the connection or securement between the aligned bars 6 is at substantially the middle of the stator unit and as the bars 6 are integrally formed with the concentric members of the sections, the desired securement between the bars 6 is accomplished with a minimum of operations.

The members 3 and 4 of the frame sections are also further connected by the interposed supports or webs 9 integral therewith and which supports or webs are adapted to be contacted by the conventional bolts 10 for holding the stator unit in desired assembly with respect to the usual end brackets thus providing effective means for holding the applied stator unit against turning movement.

As is clearly illustrated in the accompanying drawing, in the initial assembly of the stator unit the stack of laminations 1 is contacted at its ends and at its peripheral portion by the band 3 with the outer surface of such band substantially flush with the outer periphery of the stack. This permits the bars 6 to extend across the stack of laminations 1 in close contact with the periphery of the stack.

From the foregoing description it is thought to be obvious that an electric motor construction constructed in accordance with my invention is particularly well adapted for use by reason of the convenience and facility with which it may be asssembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A stator unit for an electrical apparatus comprising end frame sections, an interposed lamination stack, inwardly disposed bars carried by the frame sections, the bars of one section substantially aligning with the bars of the second section, and means for rigidly connecting the opposed end portions of said bars.

2. A stator unit for an electrical apparatus comprising end frame sections, an interposed lamination stack, inwardly disposed bars carried by the frame sections, the bars of one section substantially aligning with the bars of the second section, and weldings for rigidly connecting the opposed end portions of said bars.

3. A stator construction for an electrical apparatus including end frame sections, an interposed stack of laminations, and means extending inwardly from the end frame sections connected together at substantially the middle of the unit for holding the frame sections and laminations in desired assembled relation.

4. A stator unit for an electrical apparatus comprising end frame sections of substantially duplicate construction, each of said sections including concentric members, means for maintaining said members in assembled relation, a stack of laminations interposed between the inner members of the end sections, and inwardly disposed bars carried by the end sections extending across the periphery of the stack of laminations, the bars of one section being substantially aligned with the bars of the other section, the opposed extremities of the bars being welded together.

5. A stator unit for an electrical apparatus comprising end frame sections of substantially duplicate construction, each of said sections including concentric members, means for maintaining said members in assembled relation, a stack of laminations interposed between the inner members of the end sections, and inwardly disposed bars carried by the end sections extending across the periphery of the stack of laminations, the bars of one section being substantially aligned with the bars of the other section, the opposed extremities of the bars being welded together, the opposed extremities of the bars being provided with pockets to facilitate such welded connections.

6. A stator unit for an electrical apparatus comprising end frame sections and an interposed stack of laminations, each of said end sections comprising concentric members and interposed webs connecting said members to hold the same in assembled relation, means carried by the end sections for connection substantially midway of the stack for holding the stack and end sections in assembled relation, certain of the interposed webs constituting stops to provide means for holding the stator unit against turning when in applied working position.

7. A stator unit for an electrical apparatus comprising substantially duplicate end frame sections and an interposed stack of laminations, each of said end sections comprising concentric members, the inner member constituting a band for direct contact with an end of the stack, interposed supports for maintaining said concentric members in assembled relation, inwardly disposed bars extending from certain of said supports and overlying the periphery of the stack, said bars terminating at substantially the middle of the stack, the bars of one end section being substantially in alignment with the bars of the second end section, and means for rigidly securing together the opposed extremities of the bars.

HOMER E. REEDER.